United States Patent [19]
Mickleson

[11] 4,286,848
[45] Sep. 1, 1981

[54] REPRODUCING OBJECTIVE LENS FOR VIDEODISCS

[75] Inventor: Lee Mickleson, Long Beach, Calif.

[73] Assignee: Discovision Associates, Costa Mesa, Calif.

[21] Appl. No.: 6,327

[22] Filed: Jan. 25, 1979

[51] Int. Cl.³ .............................................. G02B 9/60
[52] U.S. Cl. ................................................. 350/467
[58] Field of Search ............................... 350/218, 467

[56] References Cited
U.S. PATENT DOCUMENTS
4,077,704  3/1978  Koizumi et al. ..................... 350/218

Primary Examiner—John K. Corbin
Assistant Examiner—Scott J. Sugarman
Attorney, Agent, or Firm—Ronald J. Clark

[57] ABSTRACT

A reproducing objective lens for videodiscs comprising five single lenses for which the working distance is large and flatness of field and resolving power are high.

1 Claim, 6 Drawing Figures

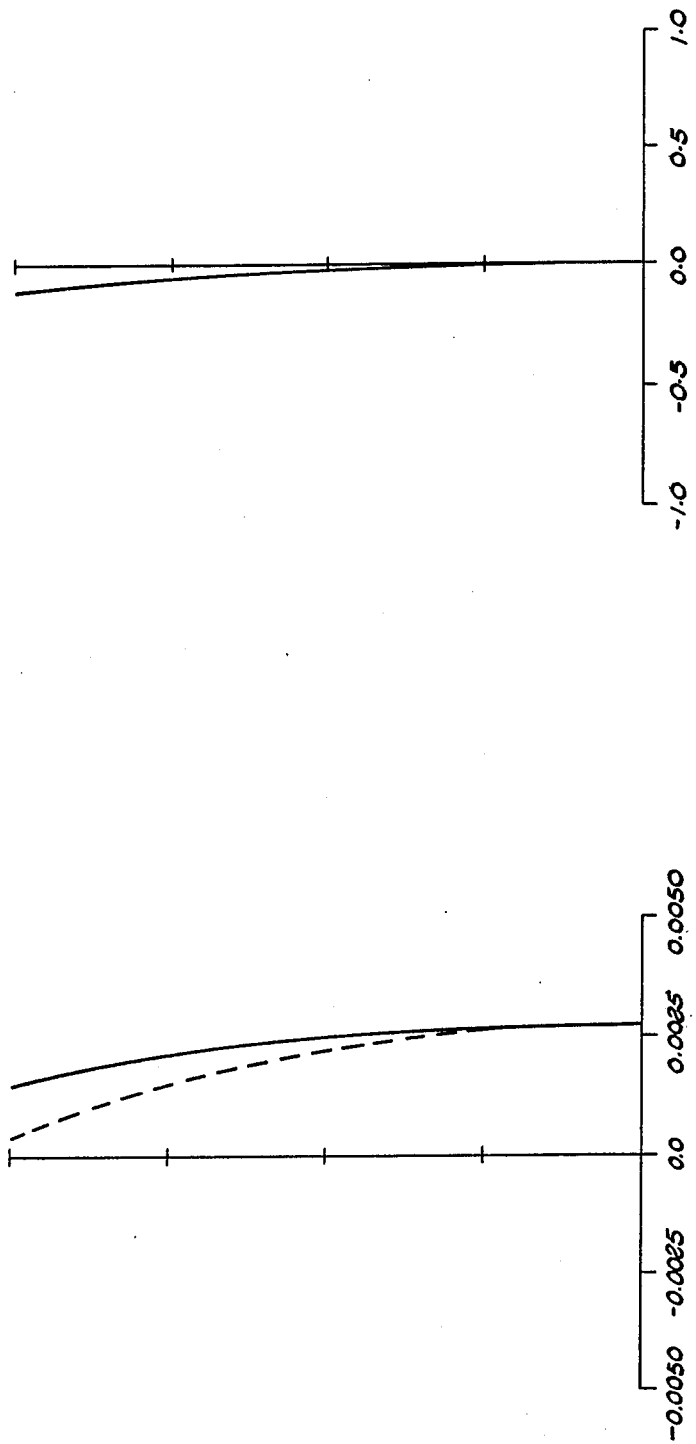

REPRODUCING OBJECTIVE LENS FOR VIDEODISCS

BACKGROUND OF THE INVENTION

1. Field of the Invention

The present invention relates to a reproducing objective lens for videodiscs and, more particularly, to a reproducing objective lens for recovering high-density information-recording discs.

2. Description of Prior Art

For objectives to be used in reproducing systems for videodiscs, it is required to guarantee a resolving power of at least $1\mu$ due to the fact that the objective lens must recover very small signals recorded at a high density. Moreoover, the information recovered from the disc, which rotates at high speed, provides information for directing the objective to follow the recorded track, information for automatic focusing and information provided for controlling the speed of rotation of the videodisc in addition to the stored video information. To insure that the objective lens recovers those kinds of information correctly, the flatness of field focussed by the objective lens should be high. To prevent the objective lens from contacting the videodisc which would result in the destruction of the videodisc and the objective lens, the working distance of the objective lens should be long. Further, to accomplish automatic focussing, the objective lens should be compact and light in weight. As the light source provided for generaton of light provided to the objective lens is generally of the monochromatic type ($\lambda = 6328$ nm), it is effective for increasing the signal to noise ratio of the recovered signal as amplified after recovery by a photo detector that the objective lens be as highly transparent to light of this wavelength as possible. Therefore, to increase the transparency, it is necessary to provide a multi-layer anti-reflection coating on the lens surfaces and to minimize the number of lenses constituting the objective lens.

SUMMARY OF THE INVENTION

A primary object of the present invention is to provide a reproducing objective lens for videodiscs for which the working distnce is large, the flatness of field is high, resolving power is high and further, the objective lens is so corrected as to compensate for aberrations introduced by additional elements fixed in the optical path and occurring in the long conjugate of the objective lens. For the objective lens, according to the present invention, the Gauss-type lens configuration is adopted as it is easier to obtain a large working distance and high flatness of field with the Gauss-type lens configuration. As shown in FIG. 1, the objective lens for videodiscs, according to the present invention, is a modified Gauss-type lens system comprising five single lenses, i.e., a first, second, third, fourth and fifth lens. The first lens is a positive lens with its planar surface positioned toward the object side, the second lens is a positive lens, the third lens is a negative meniscus lens with its convex surface positioned toward the object side, the fourth lens is a negative meniscus lens with its concave surface positioned toward the object side and the fifth lens is a positive meniscus lens with its concave surface positioned toward the object side. Further, the objective lens for videodiscs of the present invention satisfies the following conditions when reference symbol f represents the focal length of the lens system as a whole. Reference symbol $f_3$ represents the focal length of the third lens. Reference symbol $f_4$ represents the focal length of the fourth lens. Reference symbol $r_6$ represents the radius of curvature of the surface on the image side of the third lens. Reference symbol $r_7$ represents the radius of curvature of the surface on the object side of the fourth lens. Reference symbol d represents the thickness of the first lens and reference symbol $d_5$ represents the thickness of the third lens.

1. $0.30 \geq r_6/f \geq 0.23$
2. $0.27 \geq d_1/f \geq 0.15$
3. $1.4 \geq r_6/|r_7| \geq 0.9$
4. $6.0 \geq |f_3|/|f_4| \geq 2.5$
5. $0.31 \geq d_5/f \geq 0.21$ When in the lens system of the above-mentioned configuration, $r_6/f$ becomes larger than the upper limit of the condition (1) i.e., $r_6/f > 0.03$, distortion will increase and spherical aberration in the zonal and marginal portions will be overcorrected. When, on the contrary, $r_6/f$ becomes smaller than the lower limit, i.e., $r_6/f < 0.23$, astimatism will be undercorrected. Then, on the contrary, $r_6/f$ becomes smaller than the lower limit, i.e., $r_6/f < 0.23$, astigmatism will be undercorrected. When $d_1/f$ in the condition (2) becomes $d_1/f > 0.27$, the working distance becomes short and it becomes impossible to attain the object of the present invention. Moreover, spherical aberration will be undercorrected and the astimatic difference becomes large. When, on the contrary, it becomes $d_1/f < 0.15$ coma and spherical aberration in the marginal portion will become unfavorable though the working distance becomes large. It is this condition which corrects additional spherical aberrations introduced by subsequent elements interposed in the long conjugate of the objective lens.

If it becomes $r_6/|r_7| > 1.4$ in the condition (3), spherical aberration and coma will be overcorrected. If it becomes $r_6/r_7 > 0.9$, coma will be somewhat undercorrected. If it becomes $|f_3|/|f_4| < 2.5$ in the condition (4), coma and spherical aberration in the marginal portion will become large. If it becomes $|f_3|/|f_4| > 6.0$, symmetry of coma will become unfavorable. Moreover, astimatism will be undercorrected and will increase in a negative direction toward the marginal portion. If, in the condition (5), it becomes $d_5/f > 0.31$ spherical aberration will be somewhat overcorrected and, at the same time, the astimatic difference becomes large. If, on the contrary, it becomes $d_5/f < 0.21$, coma will be somewhat overcorrected.

BRIEF DESCRIPTION OF THE FIGURES

FIGS. 2A, 2B, 2C, 2D and 2E, respectively, show graphs illustrating aberration curves of the present invention.

DETAILED DESCRIPTION OF THE PREFERRED EMBODIMENT

Figure 1:
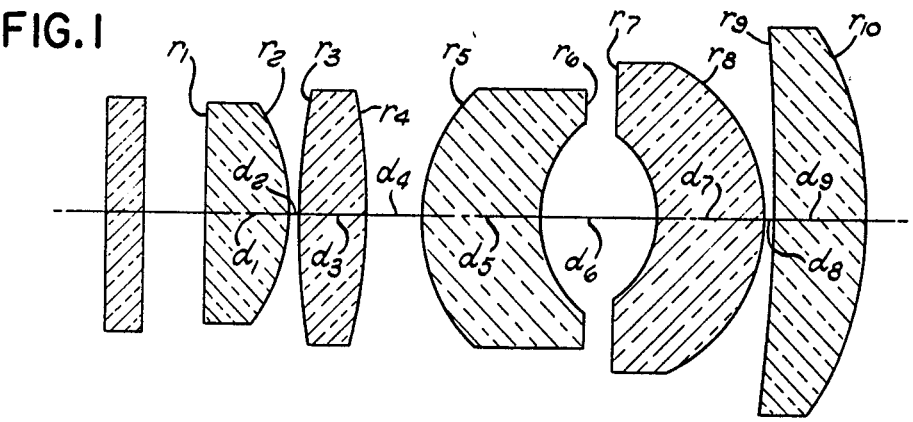
FIG. 1 shows a sectional view of the objective lens according to the present invention.
Figure 2A:
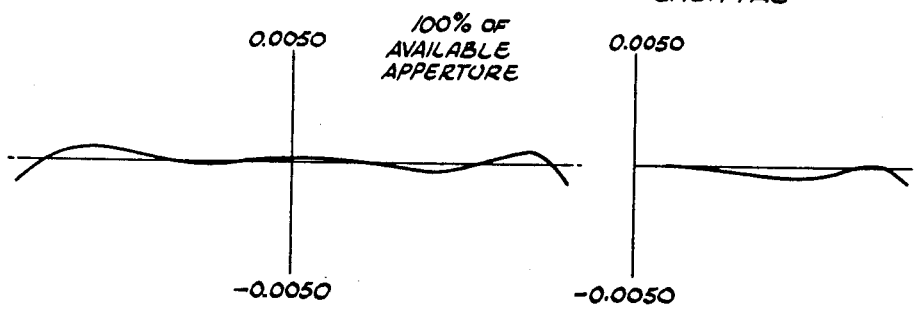
Figure 2B:
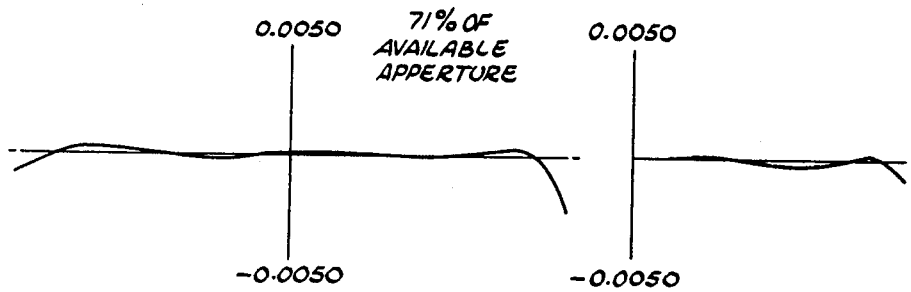
Figure 2C:
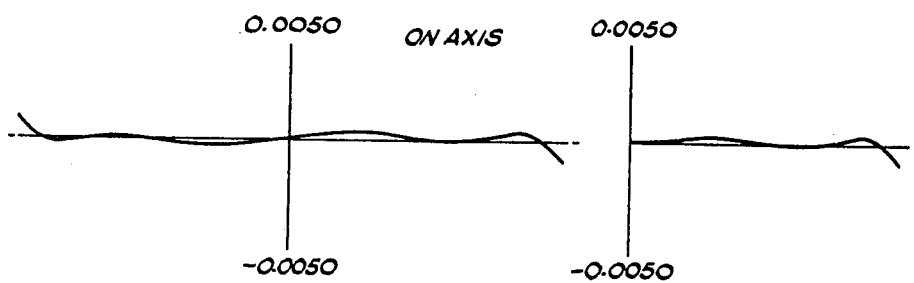

The preferred embodiment of the reproducing objective lens according to the present invention is as follows:

$r_1 = \infty$
$\quad d_1 = 2.7726 \quad n_1 = 1.547 \quad \nu_1 = 54.0$
$r_2 = -5.6308$ -continued $d_2 = 0.2500$
$r_3 = 15.9099$
$\quad d_3 = 2.2050 \; n_2 = 1.672 \; v_2 = 64.0$
$r_4 = -14.0644$
$\quad d_4 = 1.9386$
$r_5 = 5.4115$
$\quad d_5 = 3.7500 \; n_3 = 1.667 \; v_3 = 33.0$
$r_6 = 3.4870$
$\quad d_6 = 3.8136$
$r_7 = -2.8396$
$\quad d_7 = 3.5075 \; n_4 = 1.667 \; v_4 = 33.0$
$r_8 = -5.2742$
$\quad d_8 = 0.2500$
$r_9 = -69.2660$
$\quad d_9 = 3.0721 \; n_5 = 1.667 \; v_5 = 33.0$
$r_{10} = -10.2729$
$f = 13.1297 \; f_3 = -66.667 \; f_4 = -21.786$
$R_{MS}$ wavefront errors $= .021 \; 1 = 2$ In the above-mentioned embodiment, reference symbols r through $r_{10}$, respectively, represent radii of curvature of respective lens surfaces. Reference symbols d through $d_9$, respectively, represent thicknesses of respective lenses and air spaces between respective lenses. Reference symbols $n_1$ through $n_5$, respectively, represent refractive indices of respective lenses. Reference symbols $v_1$ through $v_5$, respectively, represent Abbe's numbers of respective lenses. Reference symbol f represents the focal length of the lens system as a whole. Reference symbol $f_3$ represents the focal length of the third lens. Reference symbol $f_4$ represents the focal length of the fourth lens and reference symbol 1 represents the working distance of the lens system. As explained in the above, the lens system according to the present invention fully satisfies the requirements for a reproducing objective lens for videodiscs. This is also evident from the favorably corrected aberrations shown in respective graphs of aberration curves.

What is claimed is:

1. A reproducing objective for videodiscs comprising:

a first, second, third, fourth and fifth lens;
said first lens being a positive lens, said second lens being a positive lens, said third lens being a negative meniscus lens with its convex surface positioned toward the object side, said fourth lens being a negative meniscus lens with its convex surface positioned toward the object side, said fifth lens being a positive meniscus lens with its concave surface positioned toward the object side, said reproducing objective lens for videodiscs satisfying the following conditions:

1. $0.30 \geq \Delta r_6/f \geq 0.23$
2. $0.27 \geq d_1/f \geq 0.15$
3. $1.4 \geq r_6/|r_7| \geq 0.9$
4. $6.0 \geq |f_3|/|f_4| \geq 2.5$
5. $0.31 \geq d_5/f \geq 0.21$ wherein reference symbol f represents the focal length of the lens system as a whole, reference symbol $f_3$ represents the focal length of the third lens, reference symbol $f_4$ represents the focal length of the fourth lens, reference symbol $r_6$ represents the radius of curvature of the surface on the image side of the third lens, reference symbol $r_7$ represents the radius of curvature of the surface on the object side of the fourth lens, reference symbol $d_1$ represents the thickness of the first lens and reference symbol $d_5$ represents the thickness of the third lens;

and wherein said reproducing objective for videodiscs has the following numerical data:

| | | |
|---|---|---|
| $r_1 = \infty$ | | |
| $d_1 = 2.7726$ | $n_1 = 1.547$ | $v_1 = 54.0$ |
| $r_2 = -5.6308$ | | |
| $d_2 = 0.2500$ | | |
| $r_3 = 15.9099$ | | |
| $d_3 = 2.2050$ | $n_2 = 1.672$ | $v_2 = 64.0$ |
| $r_4 = -14.0644$ | | |
| $d_4 = 1.9386$ | | |
| $r_5 = 5.4115$ | | |
| $d_5 = 3.7500$ | $n_3 = 1.667$ | $v_3 = 33.0$ |
| $r_6 = 3.4870$ | | |
| $d_6 = 3.8136$ | | |
| $r_7 = -2.8396$ | | |
| $d_7 = 3.5075$ | $n_4 = 1.667$ | $v_4 = 33.0$ |
| $r_8 = -5.2742$ | | |
| $d_8 = 0.2500$ | | |
| $r_9 = -69.2660$ | | |
| $d_9 = 3.0721$ | $n_5 = 1.667$ | $v_5 = 33.0$ |
| $r_{10} = -10.2729$ | | |
| $f = 13.1297 \; f_3 = -66.667 \; f_4 = -21.786$ | | |
| RMS wavefront errors $= .021 \; 1 = 2$ | | | wherein reference symbols $r_1$ through $r_{10}$, respectively, represent radii of curvature of respective lens surfaces, reference symbols $d_1$ through $d_9$, respectively, represent thicknesses of respective lenses and air spaces between respective lenses, reference symbols $n_1$ through $n_5$, respectively, represent refractive indices of respective lenses, reference symbols $v_1$ through $v_5$, respectively, represent Abbe's numbers of respective lenses, reference symbol f represents the focal length of the lens system as a whole, reference symbol $f_3$ represents the focal length of the third lens, reference symbol $f_4$ represents the focal length of the fourth lens and reference symbol 1 represents the working distance of the lens system as a whole.

* * * * *